Sept. 21, 1954      J. A. VANOUS      2,689,760
DETACHABLE HANDLE
Filed June 10, 1950
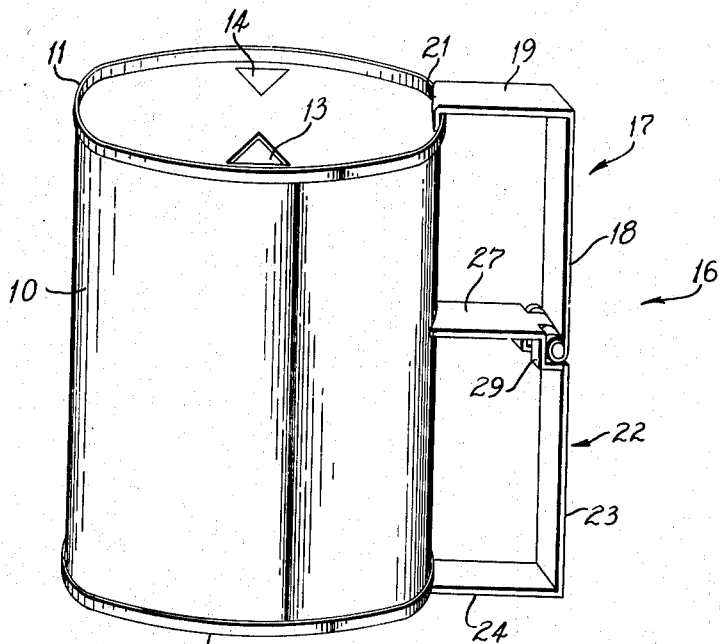
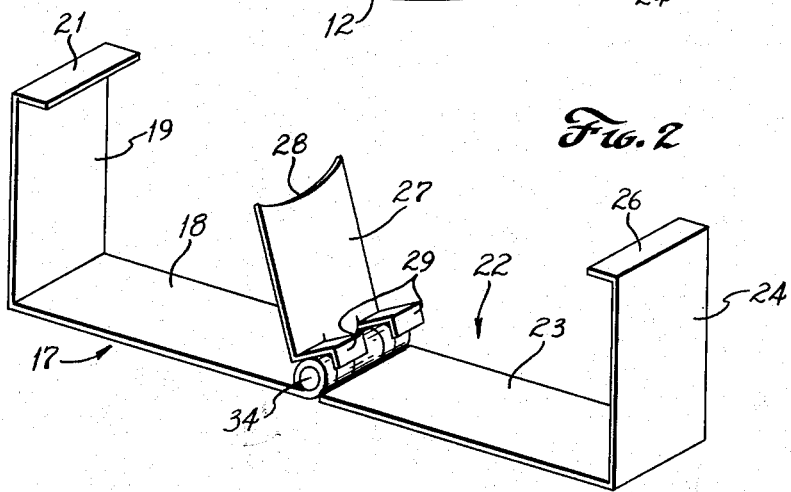
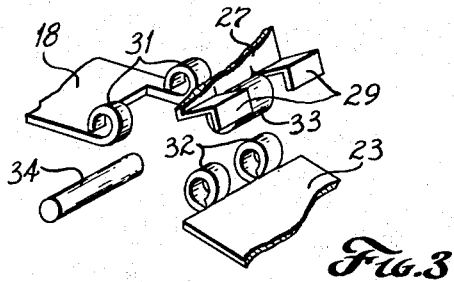
INVENTOR.
Joseph A. Vanous
BY Marvin Moody
Atty.

Patented Sept. 21, 1954

2,689,760

UNITED STATES PATENT OFFICE 2,689,760

DETACHABLE HANDLE

Joseph A. Vanous, Cedar Rapids, Iowa

Application June 10, 1950, Serial No. 167,386

5 Claims. (Cl. 294—29)

This invention relates in general to clamps and in particular to a detachable handle that may be connected to a container.

In present-day life many containers are used which contain beverages, fruit juices, and vegetable juices, and it is oftentimes desirable to drink the liquid directly from the can. For example, many producers of beer market their product in copper-lined cans and oftentimes the purchaser drinks the beer directly from the can. The cold can is uncomfortable if held in one's hand and during humid weather the cold can is often covered with condensed moisture from the air.

It is an object of this invention, therefore, to provide a detachable handle which may be connected to a beverage can while one is drinking from it.

Another object of this invention is to provide means for preventing a drinker of beverage from contacting the cold moist can.

Yet another object of this invention is to provide a cheap and simple handle which may be detachably connected to a beer can so that one may drink the beverage.

A feature of this invention is found in the provision for a generally C-shaped handle which is formed with a retaining edge at either end thereof that may be engaged with the rim of a can, and which has a pivoted brace member intermediate its ends.

Further objects, features, and advantages of this invention will become apparent from the following description and claims when read in view of the drawings, in which:

Figure 1 illustrates a container with the detachable handle of this invention attached thereto;

Figure 2 is an isometric view of the handle of this invention; and,

Figure 3 is an exploded detailed view of the pivoted retaining member.

Figure 1 illustrates a conventional cylindrical container 10 which may be, for example, a beer can. The upper edge 11 and lower edge 12 are formed with rims as is well known to those skilled in the art.

Oftentimes it is desirable to drink the beverage directly from the can, and a pair of openings 13 and 14 are formed in the top of the can with a pivoted opener of a well-known type.

The handle of this invention, designated generally as 16, is shown attached to the upper and lower rims 11 and 12, respectively. It comprises an upper generally L-shaped member 17 which has a long leg 18 and a short leg 19. A downwardly extending lip 21 is formed adjacent the end of the member 19. This is best shown in Figure 2. A lower portion 22 is generally L-shaped and comprises a long leg 23 and a short leg 24. The leg 24 has a retaining lip 26 formed adjacent its end. The members 17 and 22 are pivotally connected together adjacent their free ends.

A pivoted retaining member 27 is formed with a can-engaging portion 28 adjacent one end thereof and is pivotally connected to the members 17 and 23 adjacent its other end. Stop means 29 are connected to the member 27 and engage the member 23 to form a rigid structure when the handle is connected to a can.

This is best shown in Figure 3. The member 18 is formed with a pair of pin-receiving portions 31 and the member 23 is formed with a pair of pin-receiving portions 32 which are laterally offset from the portions 31 so that they may be received in axial alignment therebetween. Likewise, the member 27 has a portion 33 between the stops 29 which is adapted to receive a pin 34 which fits through the members 31, 32, 33 when they are in axial alignment to pivotally connect the members 18, 23, and 27 together.

To connect the handle 16 to the container, the member 27 is pivoted until it is substantially parallel to the member 17 and the retaining lips 21 and 26 are inserted over the rims 11 and 12 of the container 10. The member 17 and 22 bend slightly backward to allow the lips 21 and 26 to pass over the rims 11 and 12. Then the member 27 is pivoted downward until the arcuate portion 28 engages the side wall of the can 10. The stops 29 engage the member 22 to bind the pivot and thus form a rigid handle. After the can has been emptied the member 27 is pivoted upward and the handle may be removed until it is needed again.

It is seen that this invention provides a handle which may be quickly and easily detachably connected to a container. Although it has been described with respect to a preferred embodiment thereof it is not to be so limited as changes and modifications may be made therein which are within the full intended scope of the invention as defined by the following claims, as, for example, the handle may be clamped to the can in the inverted position.

I claim:

1. A detachable handle for a container having an upper and a lower rim comprising, an upper container-engaging portion generally L-shaped, a lower container-engaging portion generally L-shape, a third container engaging means, said third container engaging means formed with an arcuate-shaped end, and pivot means joining said upper, lower and third engaging means.

2. Apparatus according to claim 1 wherein said third engaging means is formed with a stop adjacent said pivot means and in engagement with the lower container engaging portion for binding said pivot means when the three engaging portions are in contact with the container.

3. A detachable handle for a beer can comprising a first L-shaped can engaging portion formed with a hook adjacent one end to fit the upper rim of the can, a second L-shaped can engaging portion formed with a hook adjacent one end to fit the lower rim of the can, pivot means connecting the other ends of said first and second engaging portions together, and a third can engaging portion connected to said pivot means and movable to a first position in engagement with said can and movable to a second position out of engagement with said can.

4. In apparatus according to claim 3 wherein said third can engaging portion is formed with a stop adjacent said pivot means which binds the pivot when said third engaging portion is in the first position.

5. A detachable handle for a container with upper and lower lips comprising, first container-engaging means of a generally L-shape, second container-engaging means of a generally L-shape, third container-engaging means formed with an arcuate shaped end, said first engaging means pivotally connected to one end of said third engaging means, said second engaging means pivotally connected to the third engaging means adjacent the first engaging means, and stop means connected to said third enaging means adjacent the pivot and engageable with the first engaging means for binding said pivots when the third engaging means is in contact with the container.

References Cited in the file of this patent

UNITED STATES PATENTS

| Number | Name | Date |
|---|---|---|
| 2,109,927 | Olstad | Mar. 1, 1938 |
| 2,426,682 | Hallstream | Sept. 2, 1947 |
| 2,529,737 | Oliver et al. | Nov. 14, 1950 |